(12) United States Patent
Falkenstein

(10) Patent No.: US 8,186,464 B2
(45) Date of Patent: May 29, 2012

(54) METHOD FOR OPERATING A PARALLEL HYBRID DRIVE

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 353 days.

(21) Appl. No.: 12/303,396

(22) PCT Filed: Aug. 9, 2007

(86) PCT No.: PCT/EP2007/058276
§ 371 (c)(1),
(2), (4) Date: May 18, 2009

(87) PCT Pub. No.: WO2008/043590
PCT Pub. Date: Apr. 17, 2008

(65) Prior Publication Data
US 2009/0224713 A1    Sep. 10, 2009

(30) Foreign Application Priority Data

Oct. 9, 2006 (DE) .......................... 10 2006 047 655

(51) Int. Cl.
*B60W 10/06* (2006.01)
*B60W 10/08* (2006.01)
(52) U.S. Cl. .............. 180/65.265; 180/65.285; 903/930; 903/946; 477/5
(58) Field of Classification Search ............. 180/65.265, 180/65.275, 65.28, 65.285; 903/930, 945, 903/946; 701/22, 70, 51; 477/3, 5, 14
See application file for complete search history.

(56) References Cited

U.S. PATENT DOCUMENTS

| | | | | |
|---|---|---|---|---|
| 6,740,002 | B1 * | 5/2004 | Stridsberg | 477/14 |
| 6,859,711 | B2 * | 2/2005 | Eckert et al. | 701/70 |
| 7,079,939 | B2 * | 7/2006 | Kataoka et al. | 701/112 |
| 7,099,762 | B2 * | 8/2006 | Graf et al. | 701/54 |
| 2004/0153235 | A1 | 8/2004 | Kataoka et al. | |
| 2004/0178756 | A1 | 9/2004 | Zhenxing | |
| 2004/0210373 | A1 | 10/2004 | Graf et al. | |

FOREIGN PATENT DOCUMENTS

| | | |
|---|---|---|
| DE | 10 2004 039 756 | 2/2006 |
| JP | 2003-164008 | 6/2003 |
| WO | WO 99/21263 | 4/1999 |
| WO | WO 03/041989 | 5/2003 |

OTHER PUBLICATIONS

International Search Report, PCT/EP2007/058276, dated Jan. 30, 2008.

* cited by examiner

*Primary Examiner* — John Walters
(74) *Attorney, Agent, or Firm* — Kenyon & Kenyon LLP

(57) ABSTRACT

In a method for operating a parallel hybrid drive of a vehicle, in particular of a motor vehicle, having an electric machine and an internal combustion engine, the internal combustion engine is started in the driving state of the vehicle with the aid of the electric machine by engaging a disconnecting clutch. It is provided that at least one performance quantity of the parallel hybrid drive is detected and compared with an appropriate model performance quantity of a model of the parallel hybrid drive, the model not including the internal combustion engine, and that a deviation resulting from the comparison is compensated for, at least partially, by the electric machine.

13 Claims, 3 Drawing Sheets

METHOD FOR OPERATING A PARALLEL HYBRID DRIVE

FIELD OF THE INVENTION

The present invention relates to a method for operating a parallel hybrid drive of a vehicle, in particular of a motor vehicle, having an electric machine and an internal combustion engine, the internal combustion engine being started in the driving state of the vehicle with the aid of the electric machine by engaging a disconnecting clutch.

BACKGROUND INFORMATION

Certain methods of this type for operating a parallel hybrid drive of a vehicle are conventional, the vehicle being a motor vehicle in particular. The hybrid drive of a vehicle has a drive train which includes an internal combustion engine and at least one electric machine. In the drive train of a parallel hybrid drive, the internal combustion engine may be coupled to the electric machine via a disconnecting clutch influenceable by a vehicle controller. In addition to the hybrid, boost, and recovery operating modes, a purely electric operation is also possible. A start of the internal combustion engine may be necessary even during the electric driving operation. This is the case, for example, when the driver is requesting more power than the electric machine is capable of delivering, or when the charge state of an electric accumulator supplying the electric machine has dropped substantially. A start of the internal combustion engine from electric operation takes place by engaging the disconnecting clutch while driving, and thus with the electric machine rotating, and with the internal combustion engine initially at rest. When the disconnecting clutch is engaged, the internal combustion engine is entrained, while the angular velocity of the electric machine initially drops. When the internal combustion engine gains speed as a result of the first firings, an overshoot of the rotational speed of the internal combustion engine may occur, which results in a temporary increase in the angular velocity of the electric machine. The drop and temporary increase in the angular velocity affect the drive train and impair the driving comfort.

SUMMARY

The method according to example embodiments of the present invention provides that at least one performance quantity of the parallel hybrid drive is detected and compared with an appropriate model performance quantity of a model of the parallel hybrid drive, the model not including the internal combustion engine, and that a deviation resulting from the comparison is compensated for, at least partially, by the electric machine. A deviation of this type occurs in particular in the driving state of the vehicle due to the influence of the internal combustion engine which begins when it is started with the aid of the electric machine. To at least partially compensate for a deviation of this type, a performance quantity of the parallel hybrid drive is detected that is linked to at least one characteristic quantity of the drive train, in particular the electric machine. By comparing the performance quantity with the corresponding model performance quantity, deviations from the characteristic quantity of the model operation are ascertained. For this purpose, the model of the parallel hybrid drive does not include the internal combustion engine, so that the characteristic quantity may not be affected by interference from the start of the internal combustion engine. Therefore, a corresponding interference affecting the parallel hybrid drive results in the deviation. The characteristic quantity itself does not need to be measured as long as the performance quantity correlates unambiguously with the characteristic quantity.

It is provided in particular that in the driving state of the vehicle the internal combustion engine is stopped with the aid of the electric machine by disengaging the disconnecting clutch.

It is furthermore provided that the deviation to be at least partially compensated for by the electric machine is a deviation of the performance quantity from the model performance quantity. The model performance quantity defines the desired value of the characteristic quantity of the electric machine. The performance quantity is linked to the actual operating state of the electric machine, so that a deviation of the characteristic quantity of the electric machine from a model characteristic quantity may be inferred from the deviation of the performance quantity from the model performance quantity. By compensating for the deviation of the performance quantity from the model performance quantity, the electric machine may be brought into an operating state which makes the characteristic quantity at least equal to the characteristic model quantity. The performance quantity is the characteristic quantity in particular.

It is advantageously provided that the compensation takes place by regulating the performance quantity to the model performance quantity. The performance quantity is the actual value and the model performance quantity is the setpoint value of the regulation. The regulation takes measures (for example, via an actuator) which ensure an adaptation of the performance quantity to the model performance quantity. The regulation used is a proportional regulation (P regulation) and/or a proportional-integral regulation (PI regulation) and/or a proportional-integral-differential regulation (PID regulation) in particular. Regulations of this type are characterized by a rapid regulating response. In addition, regulations having an integral component (PI or PID regulation) compensate for system deviations completely.

It is furthermore provided that the performance quantity is an angular velocity. The angular velocity of one of the components of the drive train is a performance quantity which directly or indirectly (for example, together with another quantity of the drive train) determines the characteristic quantity of the drive train.

It is provided in particular that the angular velocity is an angular velocity of the electric machine. The angular velocity of the electric machine is thus, on the one hand, the performance quantity and, on the other hand, the characteristic quantity of the drive train which is made equal to its model value for comfort optimization.

It is advantageously provided that at least one further performance quantity, in particular an angular velocity, is included in the model as an input variable. For modeling the parallel hybrid drive, another performance quantity of the parallel hybrid drive may also be included, which, however, is not adapted to a corresponding model value.

It is advantageously provided that the hybrid drive drives the vehicle via a torque converter. The torque converter is responsible for adapting the torques and rotational speeds of the internal combustion engine and/or of the electric machine to a drive shaft and the wheels of the vehicle.

It is furthermore provided that the torque converter in the model is modeled via characteristics curves and/or a characteristics map.

It is furthermore provided that the further performance quantity is included for modeling the torque converter. Using the further performance quantity, the operating point of the torque converter is selected in the model from the characteristics curves or the characteristics map.

According to example embodiments of the present invention, it is provided that the further performance quantity is an angular velocity of a vehicle drive component or a velocity of the vehicle.

According to example embodiments of the present invention, it is provided that the regulation for compensating for the deviation outputs a manipulated variable to the electric machine. The manipulated variable is, for example, a torque request or a variable linked to this torque request, which requests a positive torque from the electric machine at the beginning of the start. If the internal combustion engine applies a positive torque by itself, the start operation of the internal combustion engine is completed.

It is furthermore provided that the manipulated variable of the regulation drops below a negative threshold value when the start is completed. This negative threshold value corresponds to a negative torque request. This drop below the threshold value is used in particular for recognizing the completion of the start operation.

It is advantageously provided that the modeling of the torque converter is adapted to the torque converter by comparing the performance quantity with the model performance quantity. Changes in the properties of the actual torque converter may be taken into account by an adaptation of this type.

Example embodiments of the present invention furthermore relate to a triggering device for performing the above-mentioned method. The triggering device has elements for forming a model of the parallel hybrid drive which does not include the internal combustion engine. Furthermore, the triggering device has a comparator for comparing a performance quantity of the parallel hybrid drive with a corresponding model performance quantity of the model and a compensator for compensating the resulting deviation via the electric machine.

The following drawings show the present invention on the basis of an exemplary embodiment.

DETAILED DESCRIPTION

Figure 1:
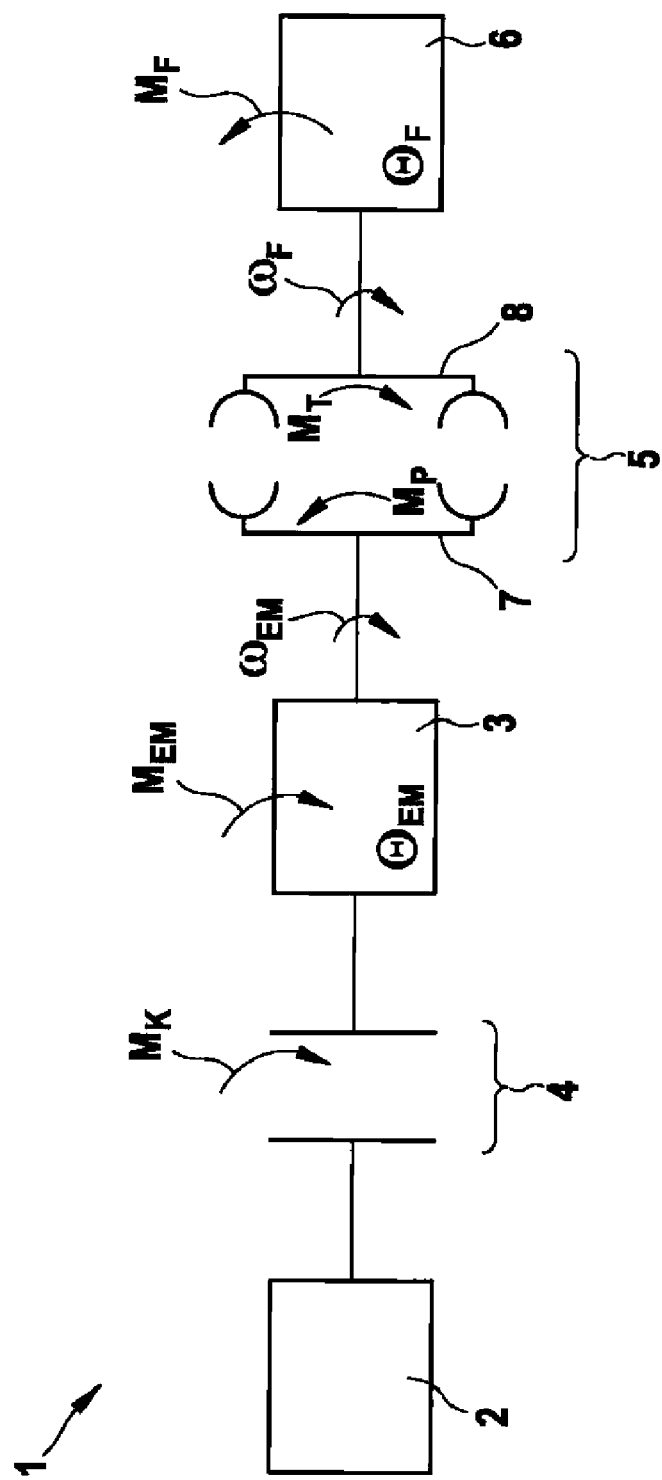
FIG. 1 schematically shows a parallel hybrid drive of a vehicle.

FIG. 1 shows a simplified model of a parallel hybrid drive train 1 having an internal combustion engine 2, an electric machine 3, and a disconnecting clutch 4 therebetween. Electric machine 3 drives the vehicle via a torque converter 5, an automatic transmission not explicitly shown, and driving wheels also not explicitly shown. The rotational moments of inertia of components of the torque converter, the automatic transmission, the drive shafts, and wheels, as well as the translationally moving vehicle masses (i.e., vehicle inertia) are combined into a common vehicle drive component 6 having an equivalent vehicle rotational mass F with moment of inertia $\Theta_F$, according to the transmission ratios recalculated to a transmission input shaft. The drive resistance forces, such as air resistance, rolling resistance, and slope resistance, are recalculated to a drive resistance torque $M_F$ acting on equivalent vehicle rotational mass F. Torque converter 5 has a pump wheel 7 and a turbine wheel 8, a turbine torque $M_T$ of the turbine wheel acting on equivalent vehicle rotational mass F.

Angular velocity $\omega_F$ of equivalent vehicle rotational mass F may be ascertained by a vehicle controller, for example, from the vehicle velocity, taking into account the transmission ratios. A sensor required therefore is not depicted in FIG. 1. The moment of inertia of a rotor of the electric machine and the rotational moments of inertia of components of torque converter 5 and of disconnecting clutch 4 are combined in an electric machine rotational mass EM having a moment of inertia $\Theta_{EM}$. Angular velocity $\omega_{EM}$ of electric machine rotational mass EM is ascertained by a speed sensor (not depicted) and reported to a vehicle controller. Air gap torque $M_{EM}$ of electric machine 3, a pump torque $M_p$ required for torque converter 5, and disconnecting clutch torque $M_K$ transmitted by disconnecting clutch 4 act on electric machine rotational mass EM. The controller is capable of influencing disconnecting clutch torque $M_K$ by disengaging or engaging disconnecting clutch 4. When the vehicle is driven by the electric machine, disconnecting clutch 4 is disengaged and $M_K$ is equal to 0. A start of internal combustion engine 2 from electric operation takes place by engaging disconnecting clutch 4 while driving, and with electric machine 3 rotating, and with internal combustion engine 2 initially at rest. Internal combustion engine 2 is entrained by the negative disconnecting clutch torque $M_K \leq 0$, while angular velocity $\omega_{EM}$ of electric machine rotational mass EM drops.

When internal combustion engine 2 gains speed, an overshoot of the internal combustion engine rotational speed may occur as a result of the first firings, which results in a temporary increase in angular velocity $\omega_{EM}$ of electric machine 3. Both affect the remaining drive train (torque converter 5 and vehicle drive components 6) and impair the driving comfort. To keep the drop or increase in angular velocity $\omega_{EM}$ at electric machine 3 low, disconnecting clutch torque $M_K$ transmitted by disconnecting clutch 4 may be partially compensated for by suitably controlling electric machine 3. Disconnecting clutch torque $M_K$ transmitted by disconnecting clutch 4 may be set and detected only imprecisely by the vehicle controller because of the varying friction coefficients of the clutch lining, hydraulic and/or mechanical inaccuracies in the control of the disconnecting clutch, and signal propagation times, among other things. Full compensation is not possible. Partial compensation may be advantageously combined with the device and the method described herein. However, this will not be discussed further due to the simpler description that follows.

Figure 2:
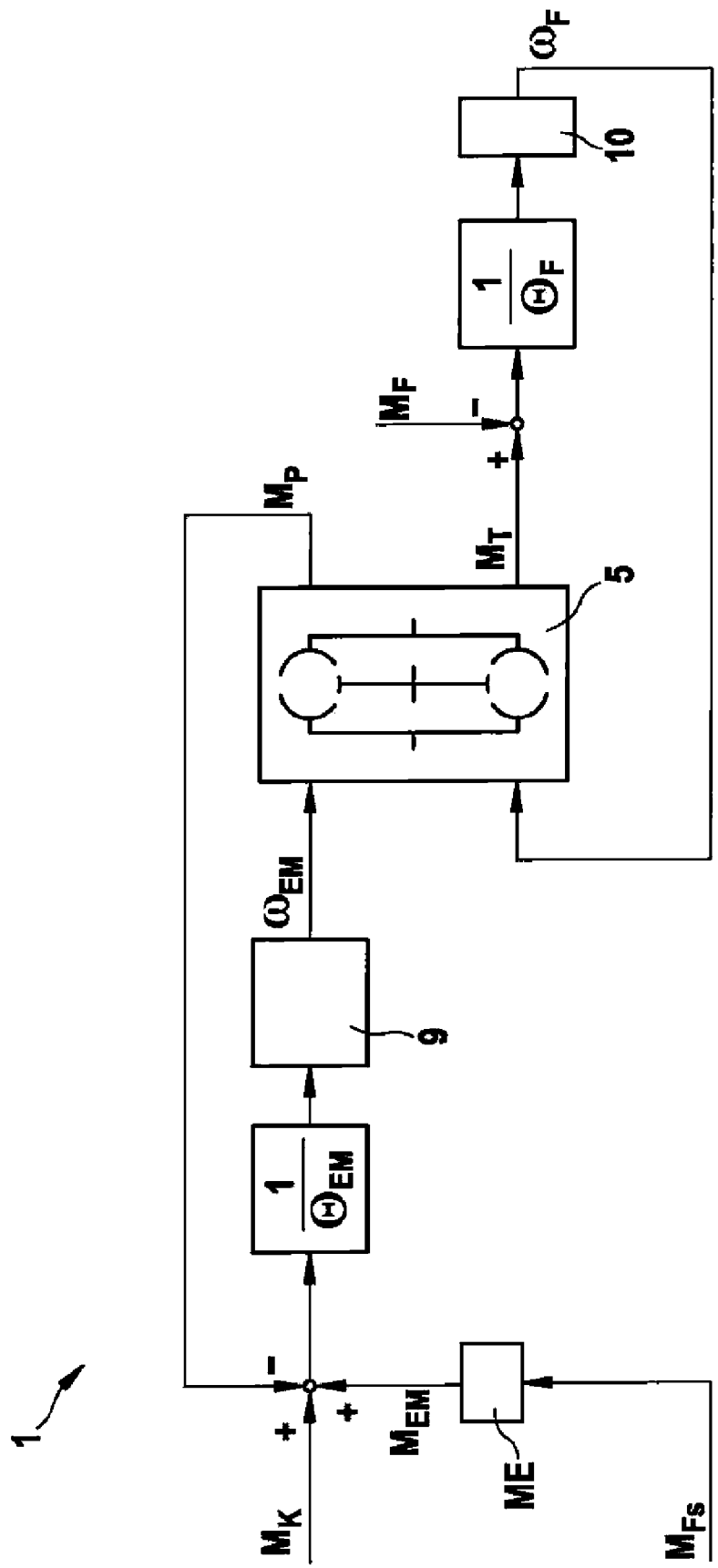
FIG. 2 shows a signal flow diagram of the parallel hybrid drive of FIG. 1.

FIG. 2 shows a signal flow diagram of drive train 1 of FIG. 1. Pump torque $M_p$ and turbine torque $M_T$ of torque converter 5 are a function of the rotational speed or the angular velocity of the pump wheel and the turbine wheel, respectively. The pump wheel is coupled to electric machine rotational mass EM and rotates at angular velocity $\omega_{EM}$ of electric machine rotational mass EM. Turbine wheel 8 of torque converter 5 is coupled to equivalent vehicle rotational mass F and rotates at angular velocity $\omega_F$ of equivalent vehicle rotational mass F. The torques acting on electric machine rotational mass EM are the following: The disconnecting clutch torque $M_K$ transmitted by disconnecting clutch 4, an air gap torque $M_{EM}$ of electric machine 3, and pump torque $M_p$, reactive during driving of torque converter 5, are added up and divided by moment of inertia $\Theta_{EM}$ of electric machine rotational mass EM. The angular acceleration of electric machine rotational mass EM is obtained from the angular momentum conservation law, and angular velocity $\omega_{EM}$ is obtained by integrating this value with the help of a first integrator 9. A similar procedure results by second integrator 10 in angular velocity $\omega_F$ of equivalent vehicle rotational mass F. Air gap torque $M_{EM}$ of electric machine 3 is obtained during electric drive operation from a driver input torque $M_{Fs}$, which is ascertained from the position of the accelerator pedal. Driver input torque $M_{Fs}$ may alternatively also be predefined by a driver assistance system or an ESP system, for example. Driver input torque $M_{Fs}$ may be filtered or its time curve shaped to avoid excitation of rotary oscillations or sudden shocks in the drive train of the hybrid drive. Air gap torque $M_{EM}$ follows driver input torque $M_{Fs}$ with a delay according to the torque regulating response of electric machine 3, which is illustrated by block ME in the signal flow diagram. As is apparent from FIG. 2, a torque $M_K$ transmitted by disconnecting clutch 4 affects angular velocities $\omega_{EM}$ of electric machine rotational mass EM, angular velocity $\omega_F$ of vehicle equivalent mass F, and turbine torque $M_T$. Turbine torque $M_T$ corresponds to the torque output by torque converter 5 to the automatic transmission (not depicted) and to the driving wheels (not depicted). Torque $M_K$ transmitted by the disconnecting clutch changes considerably during the engine start and represents an interference in the driver's input.

Figure 3:
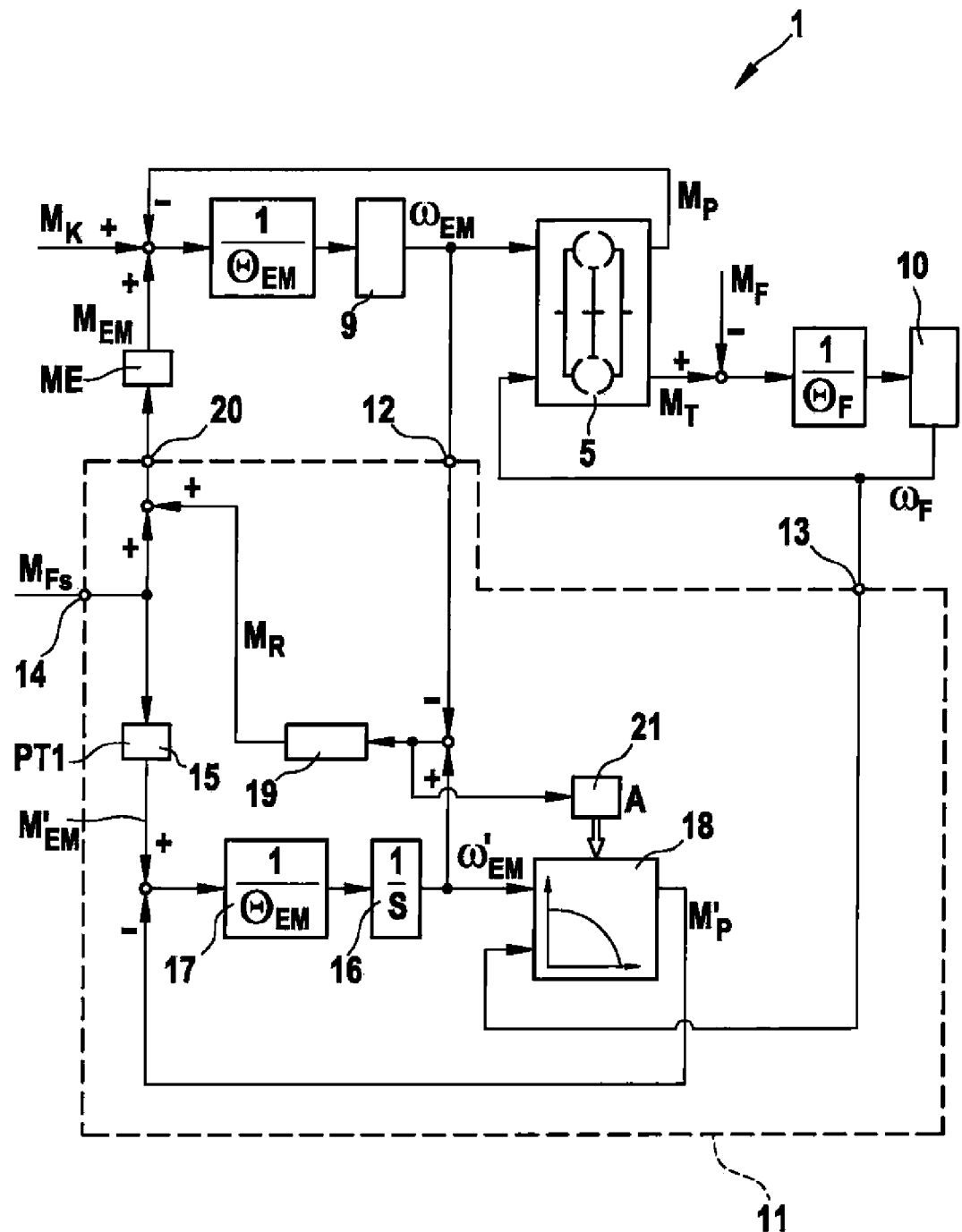
FIG. 3 shows a signal flow diagram of the parallel hybrid drive having a triggering device according to an example embodiment of the present invention.

Drive train 1 may be induced to a jolt or to rotary oscillations. FIG. 3 shows an exemplary embodiment of the drive train system having triggering device 11 according to the present invention for applying the method according to the present invention. In the top part, the signal flow diagram for drive train 1 from FIG. 1 is recognizable as corresponding to FIG. 2. Triggering device 11 is depicted in the bottom part of FIG. 3. Triggering device 11 receives measured angular velocities $\omega_{EM}$ of electric machine rotational mass EM via its input 12 and angular velocity $\omega_F$ of equivalent vehicle rotational mass F via its input 13. Alternatively, this angular velocity $\omega_F$ may be ascertained from the measured vehicle velocity. In addition, triggering device 11 receives driver input torque $M_{Fs}$ via input 14 and ascertains, with the aid of an element 15 having a first-order delay element (PT1 element) a modeled air gap torque $M'_{EM}$ which would be set based on driver input torque $M_{Fs}$. Element 15 having first-order delay element (PT1) emulates the actual torque regulation response of electric machine 3. A modeled angular velocity $\omega'_{EM}$ is ascertained with the aid of a modeled pump torque $M'_p$ and an integrator 16, as well as an amplifier element 17, which contains the inverse of moment of inertia $\Theta_{EM}$ of electric machine rotational mass EM as a multiplication factor. Modeled angular velocity $\omega'_{EM}$ corresponds to angular velocity $\omega_{EM}$ of electric machine rotational mass EM as long as disconnecting clutch 4 is disengaged and disconnecting clutch torque $M_K$ is equal to zero (for example, when the vehicle is driven electrically). Modeled pump torque $M'_p$ is ascertained by the controller with the aid of a converter model 18, which in the simplest case, is represented by characteristics curves or a characteristics map. If needed, a converter lockup clutch, in particular when it is operated in slippage, may be taken into account in converter model 18. During a start of internal combustion engine. 2, modeled angular velocity $\omega'_{EM}$ is equal to angular velocity $\omega_{EM}$ of electric machine rotational mass EM, which would be set without a disconnecting clutch torque $M_K$ transmitted by disconnecting clutch 4, i.e., when $M_K=0$, and at angular velocity $\omega_F$ of equivalent vehicle rotational mass F. A regulator 19, preferably designed as a P, PI, or PID regulator, compares angular velocity $\omega_{EM}$ of electric machine. rotational mass EM with modeled angular velocity $\omega'_{EM}$ and, in the event of deviations during the start of internal combustion engine 2, ascertains an additional regulator torque $M_R$ (a torque request of the regulator), which is output additionally via output 20 of triggering device 11 and supplied to electric machine 3. The deviation of angular velocity $\omega_{EM}$ from modeled angular velocity $\omega'_{EM}$ is thus minimized. Effects of torque $M_K$ transmitted by disconnecting clutch 4 to drive train 1 are reduced, which enhances the driving comfort. Regulator 19 is active only during the start or a stop of internal combustion engine 2; otherwise, regulator torque $M_R$ is zero ($M_R=0$). Changes in driver input torque $M_{Fs}$ during a start affect modeled angular velocity $\omega'_{EM}$ and thus angular velocity $\omega_{EM}$ of electric machine rotational mass EM, as well as turbine torque $M_T$ output by torque converter 5. Even during the start, the driver receives information about changes in driver input torque $M_{Fs}$, comparable with electric drive operation.

At the start, internal combustion engine 2 is initially entrained with negative disconnecting clutch torque $M_K$ ($M_K<0$), regulator 19 initially setting a positive regulator torque $M_R$ to compensate for disconnecting clutch torque $M_K$ decelerating electric machine 3. Upon the first successful combustions, internal combustion engine 2 generates a torque using its own power. As a result, regulator 19 compensates for the positive disconnecting clutch torque $M_K$ ($M_K>0$) generated by the internal combustion engine using a negative regulator torque $M_R$. The completion of the start where internal combustion engine 2 outputs power to drive train 1 may be recognized by torque $M_R$ of regulator 19 dropping below a negative threshold. The response of torque converter 5 is a function of different influencing factors such as, for example, the oil temperature. In electric drive operation, i.e., with disconnecting clutch 4 disengaged ($M_K=0$), converter model 18 may therefore be adapted with the aid of an element 21 by comparing angular velocity $\omega_{EM}$ and modeled angular velocity $\omega'_{EM}$. Parameter adaptation is possible even in hybrid operation, if the torque and the moment of inertia of internal combustion engine 2 are additionally taken into account when ascertaining modeled angular velocity $\omega'_{EM}$.

In the depicted exemplary embodiment, modeled pump torque $M'_p$ is ascertained with the aid of a converter model 18, to which measured angular velocity $\omega_F$ of equivalent vehicle rotational mass F is supplied. This angular velocity $\omega_F$ may contain influences of torque $M_K$ transmitted by disconnecting clutch 4 and is therefore not reaction-free. To improve the effect of triggering device 11, a modeled angular velocity $\omega'_F$ of equivalent vehicle rotational mass F may be supplied to converter model 18 during the start. This modeled angular velocity $\omega'_F$ may be predicted, for example, from the variation of angular velocity $\omega_F$ measured prior to the start. Alternatively, modeled angular velocity $\omega'_{EM}$ and modeled angular velocity $\omega'_F$ may be ascertained, for example, with the aid of disturbance observers, where the disturbance is drive resistance torque $M_F$.

The controller may be advantageously used also in the event of a stop of internal combustion engine 2. In particular when internal combustion engine 2 generates a non-zero disconnecting clutch torque $M_K$ which rapidly disappears when disconnecting clutch 4 is disengaged, for example, when internal combustion engine 2 is in overrun fuel cut-off while disconnecting clutch 4 is being disengaged, disconnecting clutch torque $M_K$ ($M_K \neq 0$) transmitted by internal combustion engine 2 prior to the disengagement of disconnecting clutch 4 is then taken into account in the model. However, when disconnecting clutch 4 is rapidly disengaged, real disconnecting clutch torque $M_K$ returns to zero just as rapidly, and a modified disconnecting clutch torque $M'_K$, which returns to zero more slowly and therefore smoothes the curve of modeled angular velocity $\omega'_{EM}$, may be used for calculating modeled angular velocity $\omega'_{EM}$. Due to the action of regulator 19, the curve of angular velocity $\omega_{EM}$ is also smoothed, whereby comfort-reducing rapid changes in turbine torque $M_T$ are avoided. Therefore, there are no excitations of rotary oscillations or jerks in drive train 1. Alternatively, disconnecting clutch torque $M_K$ which disappears when disconnecting clutch 4 is disengaged may be compensated for by electric machine 3. For calculating modeled angular velocity $\omega'_{EM}$, an ideal compensation is assumed; interference in angular velocity $\omega_{EM}$ due to the real, non-ideal compensation is minimized by regulator 19. Effects on drive train 1 are minimized in such a way that driving comfort is improved.

Angular velocity $\omega_{EM}$ of electric machine rotational mass EM is the performance quantity of the parallel hybrid drive. The corresponding model performance quantity is modeled angular velocity $\omega'_{EM}$. The deviation to be at least partially compensated for by electric machine 3 is a deviation of performance quantity $\omega_{EM}$ from model performance quantity $\omega'_{EM}$. Another performance quantity which is used in the model is angular velocity $\omega_F$ of equivalent vehicle rotational mass F. The characteristic quantity in this exemplary embodiment is equal to performance quantity $\omega_{EM}$. In general, however, it is possible that these two quantities (characteristic quantity and performance quantity) are only quantities unambiguously linked together.

What is claimed is:

1. A method for operating a parallel hybrid drive of a vehicle including an electric machine and an internal combustion engine, the method comprising:
    starting the internal combustion engine in a driving state of the vehicle with the aid of the electric machine by engaging a disconnecting clutch;
    detecting at least one performance quantity of the parallel hybrid drive and comparing the at least one performance quantity with an appropriate model performance quantity of a model of the parallel hybrid drive, the model not including the internal combustion engine; and
    compensating for a deviation resulting from the comparison, at least partially, by the electric machine;
    wherein, in the driving state of the vehicle, the internal combustion engine is stopped with the aid of the electric machine by disengaging the disconnecting clutch.

2. The method according to claim 1, wherein the vehicle is arranged as a motor vehicle.

3. The method according to claim 1, wherein the deviation to be at least partially compensated for by the electric machine is a deviation of the performance quantity from the model performance quantity.

4. The method according to claim 1, wherein the compensation takes place by regulating the performance quantity to the model performance quantity.

5. The method according to claim 1, wherein the at least one performance quantity includes an angular velocity of the electric machine.

6. The method according to claim 1, wherein at least one of (a) at least one further performance quantity and (b) an angular velocity is included in the model as an input variable.

7. The method according to claim 6, wherein the further performance quantity is used for modeling a torque converter.

8. The method according to claim 6, wherein the further performance quantity includes at least one of (a) an angular velocity of a vehicle drive component and (b) a velocity of the vehicle.

9. The method according to claim 1, wherein the hybrid drive is adapted to drive the vehicle via a torque converter.

10. The method according to claim 9, wherein the torque converter in the model is modeled via at least one of (a) characteristics curves and (b) a characteristics map.

11. The method according to claim 1, wherein the modeling of a torque converter is adapted to the torque converter by comparing the performance quantity with the model performance quantity.

12. A method for operating a parallel hybrid drive of a vehicle including an electric machine and an internal combustion engine, the method comprising:
    starting the internal combustion engine in a driving state of the vehicle with the aid of the electric machine by engaging a disconnecting clutch;
    detecting at least one performance quantity of the parallel hybrid drive and comparing the at least one performance quantity with an appropriate model performance quantity of a model of the parallel hybrid drive, the model not including the internal combustion engine; and
    compensating for a deviation resulting from the comparison, at least partially, by the electric machine;
    wherein a regulator outputs a manipulated variable to the electric machine for compensating the deviation, and
    wherein the manipulated variable of the regulator drops below a negative threshold value when the start is completed.

13. A system for operating a parallel hybrid drive of a vehicle, including an electric machine and an internal combustion engine, comprising:
    a triggering device adapted to perform the following:
        starting the internal combustion engine in a driving state of the vehicle with the aid of the electric machine by engaging a disconnecting clutch;
        detecting at least one performance quantity, which includes at least one angular velocity, of the parallel hybrid drive and comparing the at least one performance quantity, which includes the at least one angular velocity, with an appropriate model performance quantity, which includes modeled angular velocity, of a model of the parallel hybrid drive, the model not including the internal combustion engine; and
        compensating for a deviation resulting from the comparison, at least partially, by the electric machine;
        wherein, in the driving state of the vehicle, the internal combustion engine is stopped with the aid of the electric machine by disengaging the disconnecting clutch.

\* \* \* \* \*